(12) United States Patent
Mishima et al.

(10) Patent No.: US 6,648,369 B2
(45) Date of Patent: Nov. 18, 2003

(54) INFLATABLE SEAT BELT APPARATUS

(75) Inventors: Masaru Mishima, Shiga (JP); Akira Kokeguchi, Shiga (JP)

(73) Assignee: Takata Corporation, Tokyo (JP)

( * ) Notice: Subject to any disclaimer, the term of this patent is extended or adjusted under 35 U.S.C. 154(b) by 36 days.

(21) Appl. No.: 10/020,198

(22) Filed: Dec. 18, 2001

(65) Prior Publication Data
US 2002/0074784 A1 Jun. 20, 2002

(30) Foreign Application Priority Data
Dec. 18, 2000 (JP) .................................... 2000-384034

(51) Int. Cl.⁷ ............................................... B60R 21/18
(52) U.S. Cl. ........................................ 280/733; 280/739
(58) Field of Search .............................. 280/733, 739; 244/122 R, 122 AG (56) References Cited

U.S. PATENT DOCUMENTS

| | | | |
|---|---|---|---|
| 5,346,250 A | 9/1994 | Kamiyama | 280/733 |
| 6,142,517 A * | 11/2000 | Nakamura et al. | 280/739 |
| 6,406,059 B1 * | 6/2002 | Taubenerger et al. | 280/733 |
| 6,439,601 B1 * | 8/2002 | Iseki | 280/733 |

FOREIGN PATENT DOCUMENTS

| | | |
|---|---|---|
| JP | 05-085301 | 4/1993 |
| JP | 06-135293 | 5/1994 |

* cited by examiner

*Primary Examiner*—Eric Culbreth
(74) *Attorney, Agent, or Firm*—Foley & Lardner (57) ABSTRACT

An inflatable belt for use in a seat belt apparatus. The belt provides an increased inflation length without having to pass an inflatable bag through a belt guide. A seat belt apparatus may include the air belt which may include a webbing of which at least a part that comes into contact with an occupant is formed as a bag-like portion and the remaining part is formed as a single-band portion. The apparatus has a bag stored in the bag-like portion of the webbing in such a manner that the bag is folded along both the longitudinal direction thereof and the direction perpendicular to the longitudinal direction thereof. The air belt includes cover that covers the webbing. When a gas is injected into the bag the bag inflates to expand the webbing and to provide EA effect and occupant protection.

11 Claims, 10 Drawing Sheets

Prior Art

Fig. 9(b)

Prior Art

Fig. 9(c)

Prior Art

INFLATABLE SEAT BELT APPARATUS

BACKGROUND OF THE INVENTION

The present invention relates to air belts that include a bag-like portion. The bag-like portion maintains a band-like shape under normal conditions, and which inflates in an emergency, for example when a vehicle collides upon receiving a gas supplied from gas generating means. The present invention also relates to inflatable seat belt apparatuses using the air belts. More specifically, the present invention relates to an air belt in which the length of a bag can be increased and to an inflatable seat belt using the air belt.

Conventionally, seats in vehicles such as automobiles, etc., are usually provided with seat belts. In an emergency, for example when a vehicle collides, the webbings of the seat belts restrain occupants and prevent them from, for example colliding with the vehicle body and being injured. However, in typical seat belts the belts for restraining the occupants are constructed of webbings having a relatively small width, so that the occupants receive a relatively large load when being restrained by the webbings.

Japanese Patent Application Publication No. 6-135293 (incorporated by reference) discloses an inflatable seat belt apparatus including an air belt. The air belt has a webbing which is formed like a bag, and maintains a band-like shape under normal conditions so that the webbing functions similar to a typical seat belt. In an emergency, the webbing inflates upon receiving a gas supplied from gas generating means so that the occupant can be received by the inflated webbing. In such an air belt included in an inflatable seat belt apparatus, the area of the webbing which receives the kinetic energy of the occupant is increased, so that the load can be dispersed. Accordingly, the load applied to the occupant is reduced and the occupant is more effectively protected.

In addition, when the webbing inflates, the length thereof is reduced and the thickness thereof is increased, so that the body of the occupant is pushed against the seat by an amount corresponding to the increase in thickness of the webbing. More specifically, since the length of the webbing is reduced and the thickness thereof is increased, the same effect that occurs in the case in which the webbing is retracted can be obtained. Thus, according to the above-described inflatable seat belt, an initial restraining force as in conventional pretensioners can be obtained.

Figures 9A, 9B, 9C:
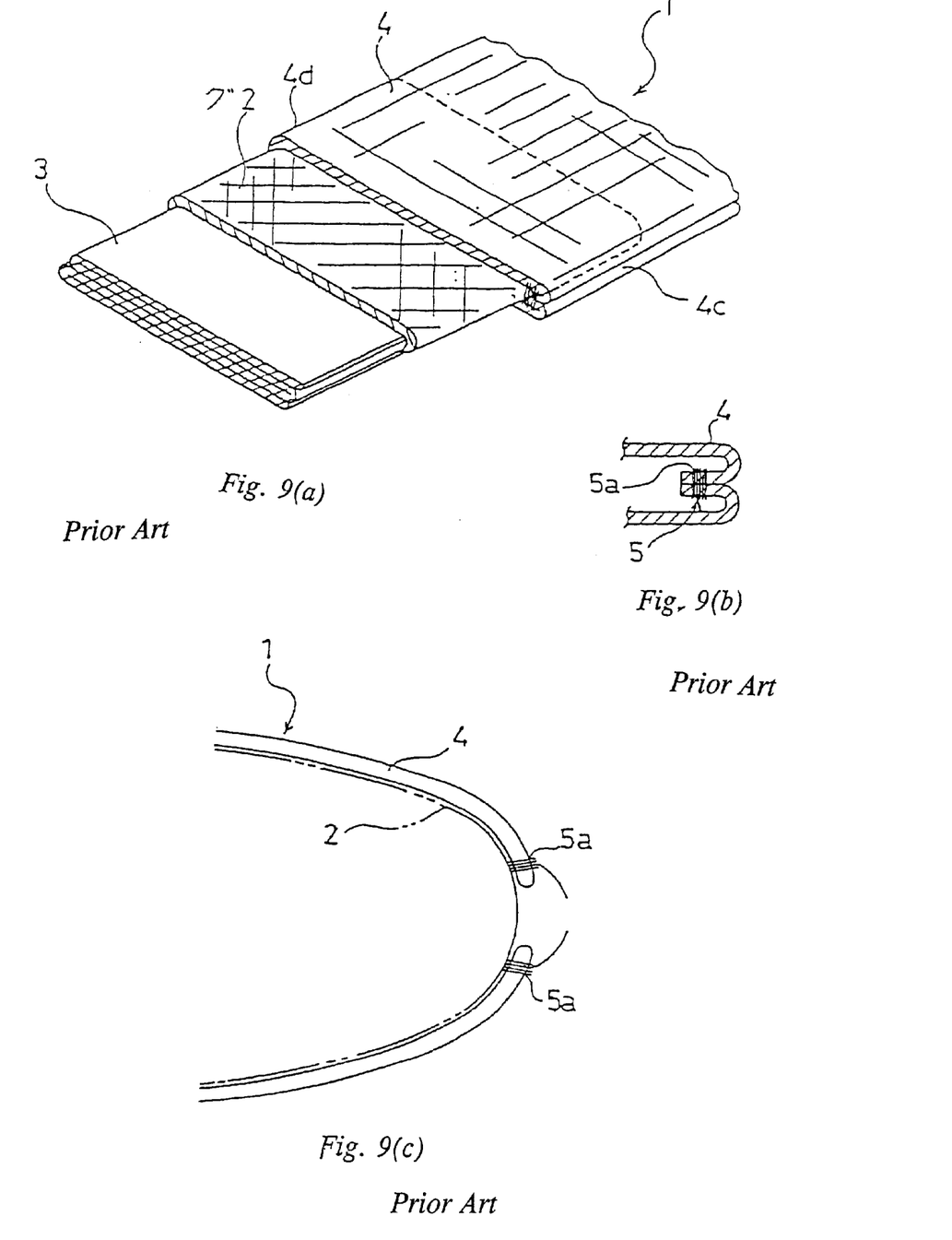
FIG. 9(a) is a cut-away perspective view of part of the air belt under normal conditions in which the band-like shape thereof is maintained.
FIG. 9(b) is a cross-sectional view of a side portion of a cover shown in FIG. 9(a)
FIG. 9(c) is a diagram showing a manner in which the cover opens when the air belt inflates.

Typically air belts used in inflatable seat belts (including the air belt disclosed in the above-referenced publication) are constructed as shown in FIGS. 9(a) and 9(b). As shown in the figures, an air belt 1 includes a webbing 2 in which at least the part that comes into contact with an occupant is formed as a bag-like portion, a bag 3 which is inserted in the webbing 2, and a cover 4 which has a tubular shape and which covers the webbing 2. The bag 3 is constructed of an elastic material such as urethane, silicone, etc., which can be formed into a relatively thin sheet, and which has heat resistance and a relatively high strength. The cover 4 is formed of a resin such as polyester, etc.

Figure 10A:
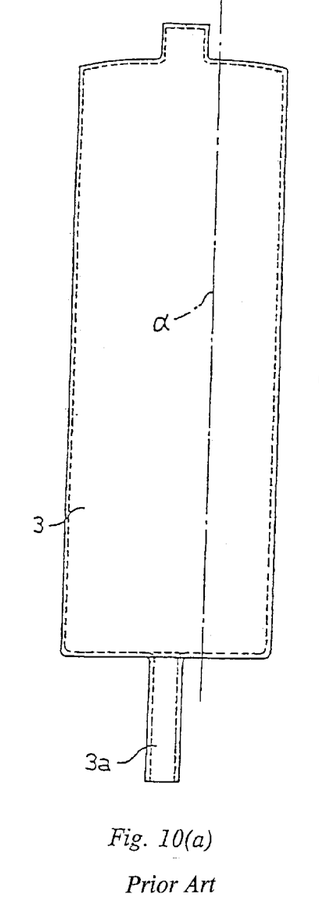
FIG. 10(a) is a diagram showing a state in which the bag is not yet folded.
Figure 10B:
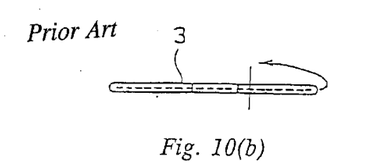
FIG. 10(b) is an end plan view of FIG. 10(a)
Figure 10C:
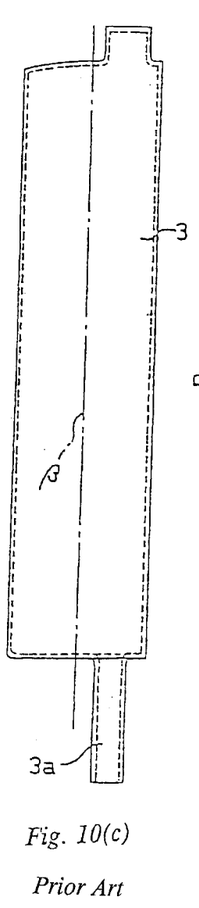
FIG. 10(c) is a diagram showing a state in which the bag is folded along the direction perpendicular to the longitudinal direction thereof.
Figure 10D:
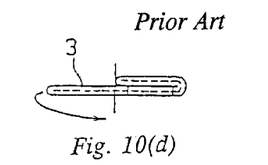
FIG. 10(d) is an end plan view of FIG. 10(c)
Figure 10E:
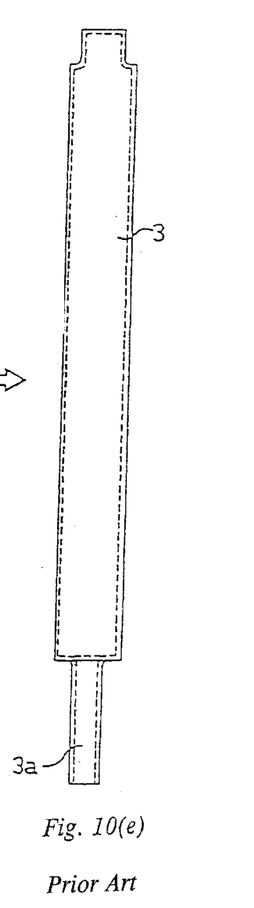
Figure 10F:
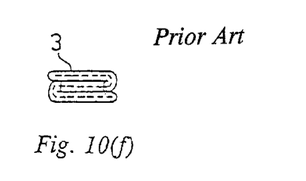
FIG. 10(f) is an end plan view of FIG. 10(e).

As shown in FIG. 10(a), the bag 3 is formed in the shape of a thin, long band, and a gas inlet 3a is provided at the lower end thereof. As shown in FIGS. 10(c) and 10(d), the right side portion of the bag 3 is folded in the direction shown in FIG. 10(b) along the folding line α shown in FIG. 10(a), which extends in the longitudinal direction of the bag 3, at approximately one-third of the width from the right end. In addition, the left side portion of the bag 3 is folded in the direction shown in FIG. 10(d) along the folding line β shown in FIG. 10(c), which extends in the longitudinal direction of the bag 3 at the center in the width direction thereof in a state shown in FIG. 10(c). Then, as shown in FIG. 9(a), the bag 3 is stored in the webbing 2 in such a manner that the longitudinal direction of the bag 3 is along the longitudinal direction of the webbing 2.

Under normal conditions, the flat, band-like shape of the webbing 2 and the bag 3 is maintained by the cover 4. Part of the webbing 2 which is not the bag-like portion is wound by a seat belt retractor fixed at the bottom of the vehicle body and extends therefrom in a manner similar to, for example, the seat belt apparatus disclosed in the above-referenced publication. In addition, the bag-like portion of the webbing 2 which is extracted from the seat belt retractor is guided toward the occupant by a belt guide which is fixed to, for example, a center pillar, and extends to a tongue connected the webbing 2.

In the air belt 1 having the above-described construction, when a gas supplied from an inflator is injected into the bag 3 via the gas inlet 3a, the bag 3 starts to inflate. Then, the webbing 2 also starts to inflate along with the bag 3, and a sewing thread 5a in a sewn portion 5 of the cover 4 breaks as shown in FIG. 9(c) due to the inflation force of the webbing 2 and the bag 3. Thus, the cover 4 opens so that the webbing 2 and the bag 3 can further inflate.

However, in the above-described folding method of the bag 3, since the bag 3 is folded along only the folding lines α and β which extend in the longitudinal direction of the bag 3, the length of the folded bag 3 is long. Accordingly, the bag 3 stored in the bag-like portion of the webbing 2 along the longitudinal direction of the webbing 2 extends over a relatively long area. In order to more effectively inflate the bag-like portion of the webbing 2, the length of the bag 3 must be increased.

When the length of the bag 3 is increased, a part of the bag 3 slides inside the belt guide along with the webbing 2, so that the belt cannot be smoothly extracted and retracted under normal conditions. In addition, since the bag 3 extends to the tongue, the webbing, which is slidably connected to the tongue, the tongue cannot be slid smoothly. Accordingly, there is a problem in that the belt and tongue cannot be easily operated.

In addition, in the bag contained in the conventional air belt, the volume to which the bag inflates is constant irrespective of the deceleration of the vehicle, (i.e., the inertia of the occupant), so that energy absorption effect (EA effect) cannot be obtained. Thus, in order to obtain EA effect, the bag 3 is provided with a vent hole through which the gas is expelled when inflation is completed. However, when the vent hole is provided in the bag 3, the gas inside the bag 3 is expelled in a relatively short time. Thus, in the case in which, for example, a roll-over of the vehicle occurs and the occupant must be restrained for a relatively long time although the deceleration of the vehicle is less than that generated in a vehicle collision, there is a problem with conventional air belts in that there is a reduction in the restraining force applied to the occupant by the air belt.

SUMMARY OF THE INVENTION

In consideration of the above-described situation, an object of the present invention is to provide an air belt, in which the length of an inflating portion of a webbing can be increased and a belt and a tongue can be easily operated, and to an inflatable seat belt apparatus using the air belt.

In addition, another object of the present invention is to provide an air belt, in which reduction of the restraining force can be prevented when, for example, a roll-over of an vehicle occurs and the occupant is restrained for a relatively long time, and an inflatable seat belt apparatus using the air belt.

In order to solve the above-described problems, an air belt according to an embodiment of the present invention may include a webbing of which at least a part that comes into contact with an occupant is formed as a bag-like portion, and of which a band-like shape is maintained under normal conditions; a bag which is stored in the bag-like portion of the webbing in such a manner that the longitudinal directions of the bag and the webbing are the same, and which, in an emergency, inflates due to a gas supplied from a gas generator and inflates the bag-like portion of the webbing; and a cover which, under normal conditions, covers a predetermined region including the bag-like portion of the webbing, and which, in an emergency, opens due to an inflation force applied by the bag and the bag-like portion. The bag is stored in the bag-like portion in such a manner that the bag is folded along at least a folding line which is perpendicular to the longitudinal direction of the bag.

In addition, according to an embodiment of the present invention, an inflatable seat belt apparatus using the air belt described above may include a seat belt retractor which, under normal conditions, allows extraction and retraction of the webbing of the air belt, and which, in an emergency, prevents the extraction of the webbing; a belt guide which has a belt guide hole, through which the webbing that extends from the seat belt retractor is inserted in a slidable manner so that the webbing is guided toward the occupant at least under normal conditions; and a tongue which is retained by the webbing and which engages with a buckle fixed to a body of a vehicle. The bag stored in the bag-like portion of the webbing is disposed in a region closer to the occupant than the belt guide, and the bag inflates in at least one of a direction toward the belt guide and a direction toward the tongue.

In addition, according to an embodiment of the present invention, the bag may be provided with a vent hole which is hidden inside the folded bag under normal conditions, and which appears when the bag inflates in the direction toward the belt guide so that the gas inside the bag is expelled therethrough.

In addition, according to an embodiment of the present invention, the bag may be provided with a gas inlet, through which the gas supplied from the gas generating means is injected into the bag, at a position close to the tongue or at a position close to the belt guide.

In the air belt according to an embodiment of the present invention, under normal conditions, the bag is folded along the folding line which is perpendicular to the longitudinal direction thereof. Thus, even when the actual length of the bag is set to a relatively long length, the length of the bag in the state in which it is stored in the bag-like portion of the webbing is reduced.

In addition, since the length of the bag in the stored state is reduced, not only can the actual length of the bag be increased, but there is more freedom to set a length.

In addition, according to an embodiment of the present invention, the bag stored in the bag-like portion of the webbing does not move through the guide hole of the belt guide under normal conditions. Accordingly, under normal conditions, the belt can be smoothly and reliably extracted and retracted, so that the belt can be easily operated.

In addition, since the freedom to set the actual length of the bag is higher, the actual length of the bag can be adequately determined in accordance with the type of the vehicle in which the inflatable seat belt apparatus is mounted.

In addition, when there is large deceleration of the vehicle occurs in an emergency, for example, when the vehicle collides, the bag and the bag-like portion of the webbing start to inflate due to the gas supplied from the gas generator means. Then, the cover opens due to the inflation force, so that the bag and the bag-like portion of the webbing quickly inflate in at least one of the direction toward the belt guide and the direction toward the tongue along the longitudinal direction of the air belt. Thus, the area of the bag-like portion of the webbing which receives the kinetic energy of the occupant is increased, so that the load can be dispersed. Accordingly, the load applied to the occupant is reduced, and the occupant is more effectively protected.

In addition, since a tension is applied to the webbing due to the inertia of the occupant, an EA mechanism of the seat belt retractor is activated by receiving this tension, and the extraction of the webbing starts. The amount by which the webbing is extracted varies with the inertia of the occupant. Thus, due to the extraction of the webbing, the length of the inflating portion of the webbing varies with the inertia of the occupant. Accordingly, the tension of the webbing varies with the amount by which the length of the inflating portion of the webbing is increased. More specifically, the tension of the webbing varies along with the inertia of the occupant, that is, the physical size of the occupant. When the occupant is small, the amount by which the length of the inflating portion of the webbing is increased is small, so that the tension of the webbing is also small. When the occupant is large, the amount by which the length of the inflating portion of the webbing is increased is large, so that the tension of the webbing is also large. Accordingly, the occupant can be more effectively restrained and protected in accordance with his or her physical size.

In addition, since the bag inflates in the longitudinal direction thereof due to the extraction of the webbing, the internal pressure of the bag is reduced as the volume of the bag is increased, and the EA effect can be obtained also by the bag. Especially when the EA effect obtained by the bag and the EA effect obtained by the EA mechanism of the seat belt retractor are combined, the total EA effect can be precisely adjusted.

In addition, irrespective of the physical size of the occupant, the bag-like portion of the webbing inflates to the belt guide and the inflating portion of the bag-like portion is disposed near the side of the head of the occupant. Thus, in the case in which there is a collision with the side portion of the vehicle, the head of the occupant can be more effectively protected.

In addition, according to an embodiment the present invention, the bag may be provided with a vent hole, which is formed at a position such that the vent hole appears when the inflation of the bag in the longitudinal direction thereof is almost completed. Thus, in the case in which, for example, a roll-over of the vehicle occurs and the occupant must be restrained for a relatively long time although the deceleration of the vehicle is less than that generated in a vehicle collision, the vent hole does not appear since the inflation of the bag will not be completed. Accordingly, since only an extremely small amount of the gas inside the bag is expelled, even when the occupant is restrained and protected for a relatively long time, a reduction of the restraining force can be prevented. In addition, in the case in which, for example, the vehicle collides, the effect of absorbing the kinetic energy of the occupant due to the vent hole can be reliably obtained.

In addition, according to an embodiment of the present invention, the bag may be provided with a gas inlet at a position close to the tongue or at a position close to the belt guide. Thus, the gas generating means can be disposed either in a floor portion of the vehicle or in the upper portion of the vehicle. Especially when the gas inlet is disposed at a position close to the belt guide, the gas generator means can be disposed in a roof, a center pillar, a rear pillar, etc., of the vehicle. Thus, the excess space in the vehicle can be effectively utilized, and there is more freedom to choose the position to install the gas generating means.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 3 shows a manner in which a bag contained in the air belt shown in FIG. 1 is folded, where

FIGS. 5(a)–5(d) disclose the operation of inflating the air belt shown in FIG. 1, where

FIGS. 7(a)–7(c) disclose an air belt according to another embodiment of the present invention, where

FIGS. 9(a)–9(c) disclose an example of a conventional air belt, where

FIGS. 10(a)–10(f) disclose the steps of folding a bag contained in the conventional air belt, where FIG. 10(e) is a diagram showing a state in which the bag in the state FIG. 10(c) is folded along the longitudinal direction thereof.

DETAILED DESCRIPTION

Embodiments of the present invention will be described below with reference to the accompanying drawings. The parts of the air belt according to an embodiment of the present invention which are the same as those in the above-referenced conventional air belt are denoted by the same reference numerals.

Figure 1:
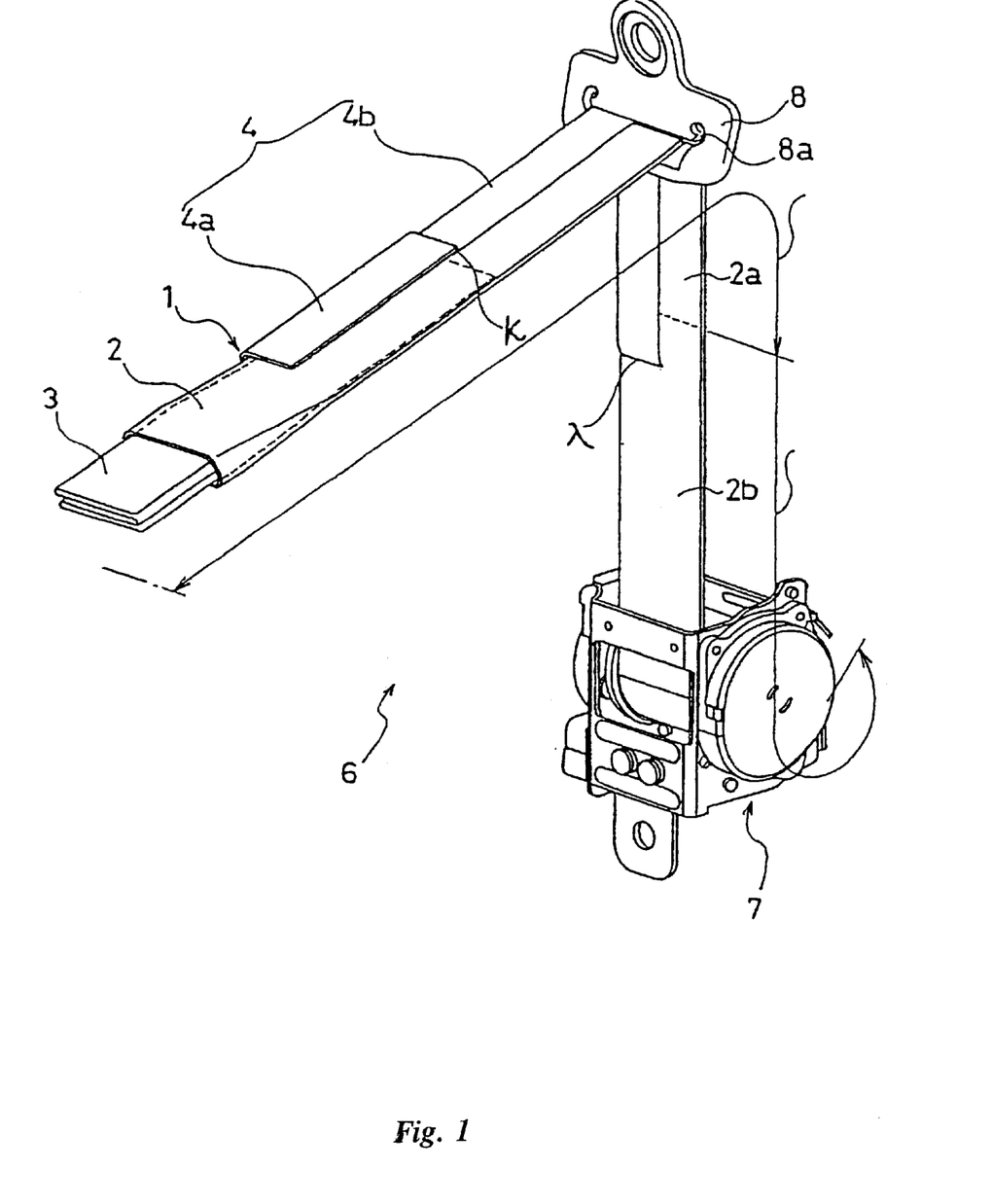
FIG. 1 is a perspective view of a belt guide, retractor and an inflatable seat belt apparatus which includes an air belt according to an embodiment of the present invention.
Figure 2:
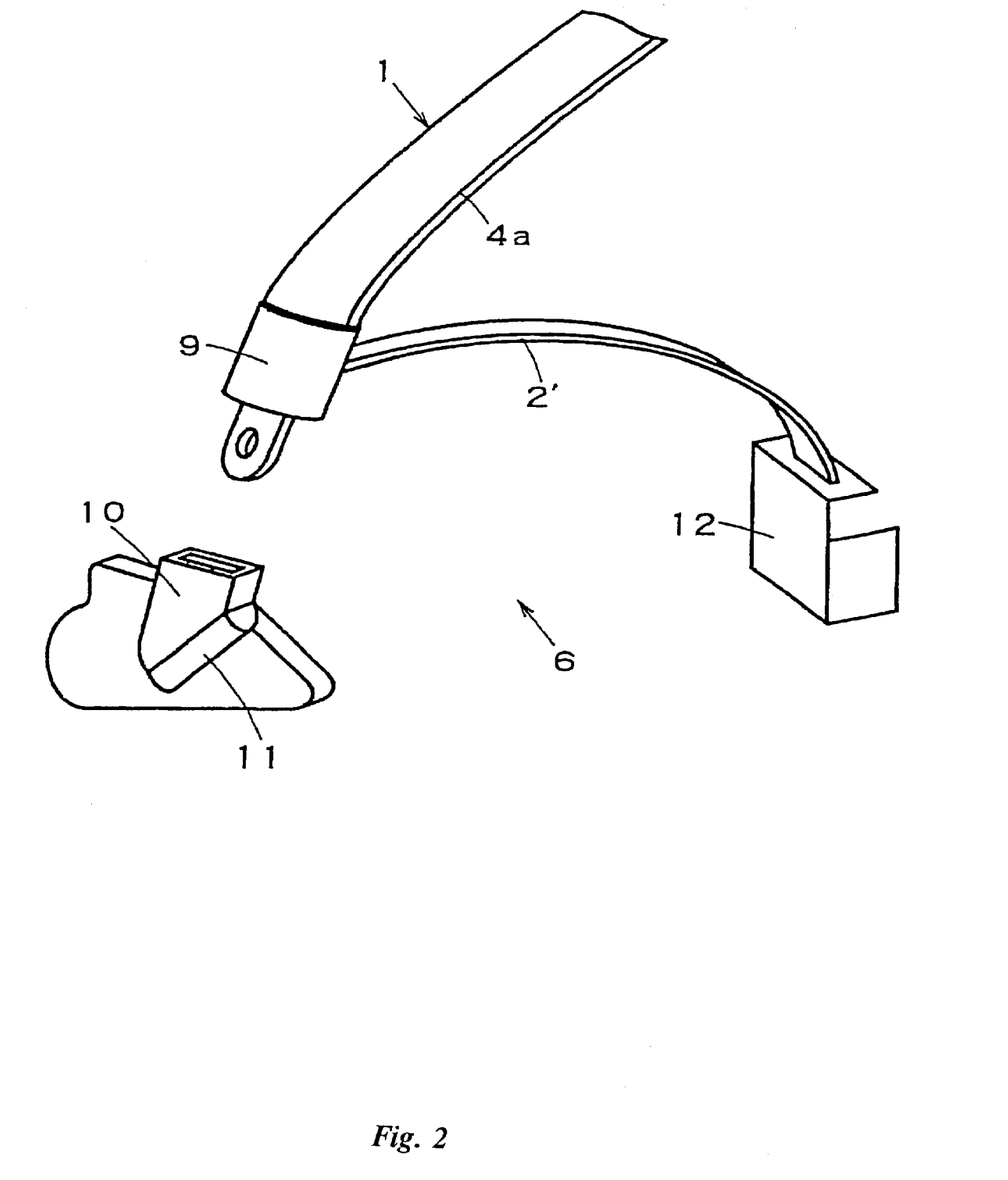
FIG. 2 is a perspective view of a tongue connected to the inflatable seat belt apparatus shown in FIG. 1.

FIGS. 1 and 2 schematically show an inflatable seat belt apparatus which includes an air belt according to an embodiment of the present invention. FIG. 1 discloses a portion of an inflatable seat around a belt guide. FIG. 2 discloses a portion of the inflatable seat belt around a tongue.

As shown in FIGS. 1 and 2, an inflatable seat belt apparatus 6 includes a webbing 2 which is to be applied across a shoulder of an occupant, a part of the webbing 2 being constructed as an air belt 1. The apparatus includes a first seat belt retractor 7 which winds a part of the webbing 2 which is not the air belt 1 in an extractable and retractable manner. A belt guide 8 which is fixed to, for example, a center pillar of the vehicle body, is provided for guiding the webbing 2 extracted from the first seat belt retractor 7 to the occupant. A tongue 9 is connected to the air belt 1 at the end opposite to the end closer to the first seat belt retractor 7. A buckle 10 which is fixed to the vehicle body is provided receiving the tongue 9. A gas generator 11 may be connected to the buckle 10. The apparatus includes a webbing 2' which is to be applied on the laps of the occupant, one end of which is connected to the tongue 9, and which is formed of a webbing which does not inflate in a manner similar to the conventional seat belt. A second seat belt retractor 12 may be provided for winding the other end of the webbing 2' in an extractable and retractable manner.

The webbing 2 to be applied across the shoulder is constructed as a mesh webbing having air permeability. Since the webbing 2 is constructed as the mesh webbing, when the bag 3 inflates as will be described below, a part of the webbing 2 which is constructed as the air belt 1 shrinks in the longitudinal direction thereof. In addition, although the webbing 2 is constructed as a mesh webbing, the strength thereof is sufficient to function as a seat belt under normal conditions.

At least a part of the webbing 2 that comes into contact with the shoulder, chest, etc., of the occupant is formed as a bag-like (i.e., inflatable) portion 2a, which serves as a part of the air belt 1. As in the above-described conventional air belt, the air belt 1 includes a bag 3 which is stored in the baglike portion 2a of the webbing 2, and a cover 4 which covers a part including the bag-like member 2a of the webbing 2. In the present exemplary embodiment, the air belt 1 is connected to the tongue 9 as shown in FIG. 2. In addition, the webbing 2 also includes a single-band (i.e, non-inflatable) portion 2b which is connected to the bag-like portion 2a at the end opposite to the end connected to the tongue 9. As in the conventional seat belt, the single-band portion 2b is wound around a spool of the first seat belt retractor 7 by a predetermined amount in an extractable and retractable manner. Under normal conditions, the bag 3 is folded in the shape of a band which has approximately the same width as the single-band portion 2b.

Figures 3A, 3B, 3C, 3D, 3E, 3F:
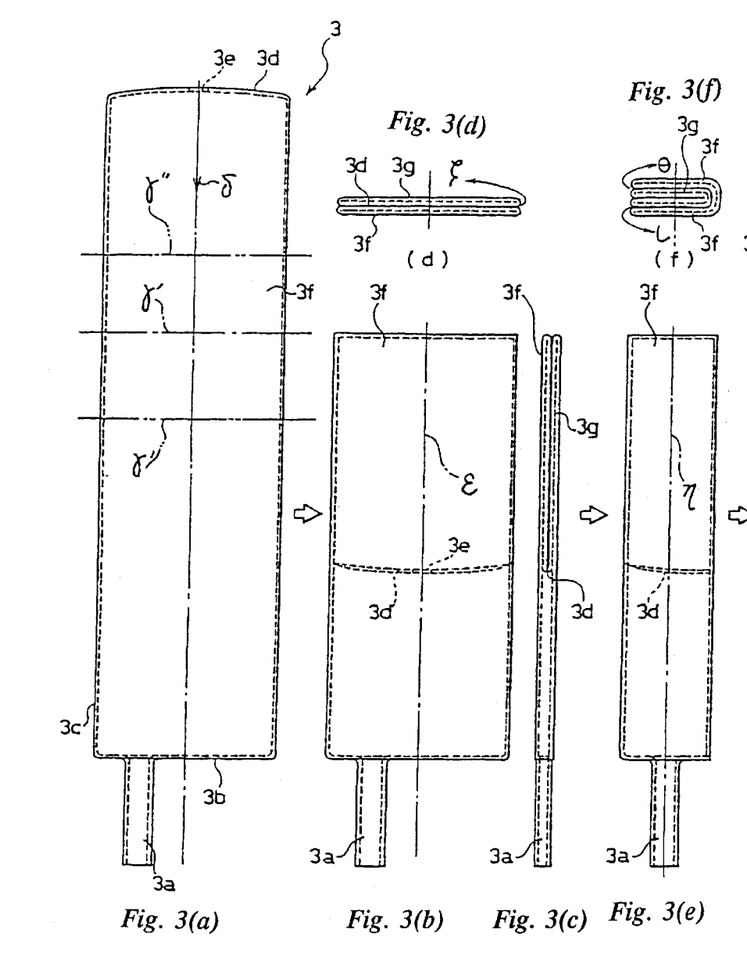
FIG. 3(a) is a diagram showing a state in which the bag is not yet folded.
FIG. 3(b) is a diagram showing a state in which the bag is folded along the direction perpendicular to the longitudinal direction thereof.
FIG. 3(c) is a right side view of FIG. 3(b)
FIG. 3(d) is an end plan view of FIG. 3(b)
FIG. 3(e) is a diagram showing a state in which the bag in FIG. 3(b) is folded along the longitudinal direction thereof.
FIG. 3(f) is an end plan view of FIG. 3(e)
Figure 3G:
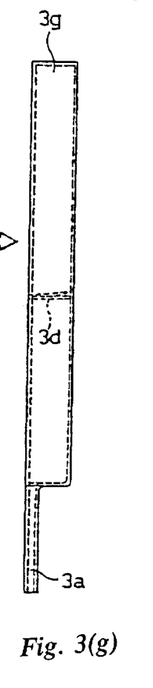
FIG. 3(g) is a diagram showing a state in which the bag in FIG. 3(e) is folded along the longitudinal direction thereof.
Figure 3H:
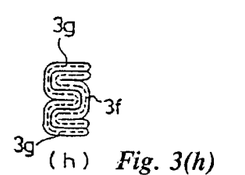
FIG. 3(h) is an end plan view of FIG. 3(g).
Figure 4A:
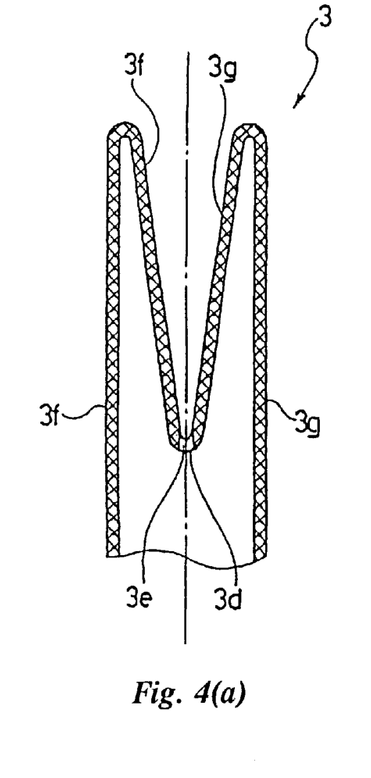
FIGS. 4(a)–4(d) are sectional views of a part of the bag shown in FIG. 3 in the process of being folded according to various embodiments of the present invention.

As shown in FIG. 3(a), the bag 3 is formed in the shape of a thin, long band or belt, and a gas inlet 3a is provided at the lower end 3b thereof at one fourth position from the left end 3c. However, the position for forming the gas inlet 3a is not limited to this position, and the gas inlet 3a may be provided at any position. In addition, as shown in an enlarged view in FIG. 4(a), a vent hole 3e is formed at the center of the upper end 3d of the bag 3. Different from the conventional bag, the bag 3 is first folded along the folding line γ shown in FIG. 3(a), which extends in the direction perpendicular to the longitudinal direction of the bag 3. At this time, the bag 3 is folded in the direction shown by the arrow 6 (see FIG. 3(a)) in such a manner that the upper end 3d thereof is disposed between a fabric 3f at the front side and a fabric 3g at the back side as shown in FIGS. 3(b) and 3(d). Accordingly, the vent hole 3e is hidden between the fabrics 3f and 3g. Next, the bag 3 is folded in the direction shown by the arrow ζ in FIG. 3(d) along the folding line ε shown in FIG. 3(b), which extends in the longitudinal direction of the bag 3, into the shape shown in FIGS. 3(e) and 3(f). Then, the bag 3 is further folded in directions shown by the arrows θ and ι in FIG. 3(f) along the folding line η shown in FIG. 3(e), which extend in the longitudinal direction of the bag 3, into the shape shown in FIGS. 3(g) and 3(h).

As shown in FIG. 1, the bag 3, which is folded in the above-described manner, is disposed at a position closer to the occupant than the belt guide 8 (that is, at the position opposite to the first seat belt retractor 7). In addition, the bag 3 is stored in the bag-like portion 2a of the webbing 2 in such a manner that the longitudinal directions of the bag and the webbing are the same 2 and that the gas inlet 3a faces the tongue 9. Since the length of the bag 3 is reduced by folding it along the folding line γ which is perpendicular to the longitudinal direction of the bag 3, the bag 3 does not extend beyond a guide hole 8a of the belt guide 8 toward the first seat belt retractor 7.

The tube-like cover 4 includes a first cover 4a and a second cover 4b, which are connected together by a sewn portion κ, and covers a predetermined part including the bag-like portion 2a of the webbing 2. The first cover 4a covers a part of the bag-like portion 2a at the region at which the bag 3 is disposed under normal conditions, and is connected to the tongue 9 as shown in FIG. 2. Under normal conditions, the first cover 4a serves to maintain the band-like shape of the bag-like portion 2a of the webbing 2 and the folded bag 3. When the bag-like portion 2a of the webbing 2 and the bag 3 inflate by receiving the gas supplied from the gas generator 11, the first cover 4a opens due to the inflation force, so that the bag-like portion 2a and the bag 3 can inflate further.

The second cover 4b covers a part of the bag-like portion 2a at the region at which the bag 3 is not disposed under normal conditions and a part of the single-band portion 2b. In addition, although not shown in the figure, the end of the second cover 4b which is opposite to the end connected to the first cover 4a is connected to the single-band portion 2b of the webbing 2 by a sewn portion λ. Under normal conditions, the second cover 4b serves to maintain the band-like shape of the bag-like portion 2a of the webbing 2. When the bag-like portion 2a of the webbing 2 and the bag 3 inflate upon receiving the gas supplied from the gas generator 11, the second cover 4b also opens due to the inflation force, so that the bag-like portion 2a and the bag 3 can further inflate.

The opening of the first and second covers 4a and 4b due to the inflation force may be realized by, for example, breaking a sewing thread in a sewn portion as in the above-described conventional technique, or by other adequate methods. A part including the second cover 4b and the single-band portion 2b of the webbing 2 can be slid inside the guide hole 8a of the belt guide 8. The cover 4 may also be formed as a single cover.

The seat belt retractor 7 may be an emergency locking retractor (ELR) which includes an energy absorbing mechanism (EA mechanism). Emergency locking retractors (ELR) which include the EA mechanism are known in the art, an example thereof will be briefly explained below. An ELR includes, for example, a spool for winding the webbing 2, a lock gear which, under normal conditions, rotates together with the spool and a torsion bar which connects the spool and the lock gear.

In the ELR, under normal conditions, the webbing can be freely extracted and retracted since the spool and the lock gear freely rotate together. When there is a large deceleration of the vehicle, for example, when the vehicle collides, rotation of the lock gear in the extracting direction of the webbing is stopped. However, since the occupant moves forward due to inertia and the load is applied to the webbing in the extracting direction, the spool tries to continuously rotate in the extracting direction of the webbing. Then, the torsion bar is twisted and the spool rotates relative to the lock gear in the extracting direction of the webbing, so that the webbing is extracted. Since the torsion bar is twisted, the kinetic energy generated when the deceleration of the vehicle occurs is absorbed, so that the load applied to the occupant by the webbing is reduced.

Thus, according to the ELR which includes the EA mechanism, when there is a large deceleration of the vehicle, the occupant is prevented from moving a large distance forward and the kinetic energy is absorbed, so that the occupant can be restrained and protected.

The first seat belt retractor 7 is preferably configured as described above. However, other known seat belt retractors may of course be used as the first seat belt retractor 7.

The tongue 9 and the buckle 10 may be provided with gas passing holes (not shown). The gas passing hole formed in the tongue 9 is connected to the gas inlet 3a, and the gas passing hole formed in the buckle 10 is connected to a gas outlet of the gas generator 11. When the tongue 9 is inserted into the buckle 10, the gas passing holes formed therein are connected to each other, so that the gas supplied from the gas generator 11 can be injected into the bag 3 through the gas passing holes and the gas inlet 3a.

Figure 5A:
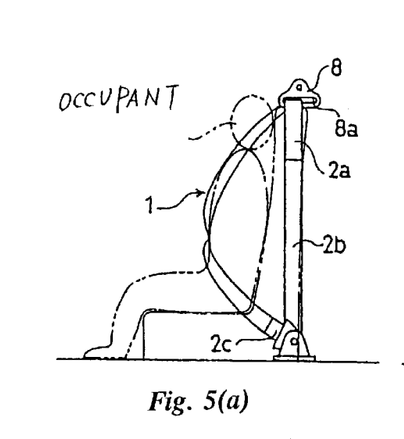
FIG. 5(a) is a diagram showing a state in which the air belt is fastened under normal conditions.

In the inflatable seat belt apparatus 6 which is constructed as described above, under normal conditions, the gas generator 11 is not activated and the gas is not injected from the gas generator 11 into the bag 3. Thus, the band-like shape of the bag-like portion 2a of the webbing 2 and the bag 3 is maintained. Accordingly, as shown in FIG. 5(a), the tongue 9 is engaged with the buckle 10 so that the air belt 1, which extends from the belt guide 8, is applied to the occupant from his/her shoulder to his/her chest. Thus, under normal conditions, the air belt 1 functions as a typical seat belt.

In an emergency, for example when the vehicle collides, there is a large deceleration of the vehicle and the first seat belt retractor 7 is activated, so that rotation of the lock gear in the first seat belt retractor 7 in the extracting direction of the webbing is stopped. In addition, the gas generator 11 is activated and the gas is generated.

Then, the occupant moves forward due to inertia, and the torsion bar is twisted so that the kinetic energy is absorbed and the webbing is extracted. In addition, the gas supplied from the gas generator 11 is injected into the bag 3 through the gas passage holes formed in the buckle 10 and the tongue 9 and through the gas inlet 3a. Thus, the bag 3 starts to inflate, so that the bag-like portion 2a of the webbing 2 also starts to inflate at the region corresponding to the inflating portion of the bag 3. Then, the first cover 4a opens due to the inflation force applied by the bag 3 and the bag-like portion 2a, and the second cover 4b also opens at the region corresponding to the inflating portion of the bag-like portion 2a of the webbing 2. Accordingly, the bag 3 first inflates mainly in the width direction thereof, and then inflates mainly in the longitudinal direction thereof toward the belt guide 8. Accordingly, the inflating portion of the bag-like portion 2a of the webbing 2 extends toward the belt guide 8 in accordance with the inflation of the bag 3 in the longitudinal direction thereof.

Figure 5B:
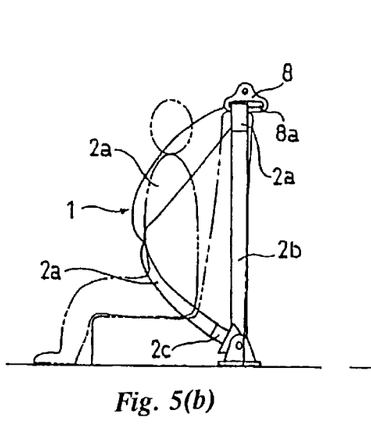
FIG. 5(b) is a diagram showing a state in which inflation of the air belt is started.

Then, before the bag 3 has completely inflated in the longitudinal direction thereof, that is, before the upper end 3d and the vent hole 3e of the bag 3 appears, the bag 3 reaches the belt guide 8. However, since the bag 3 is inflated, it does not move through the guide hole 8a of the belt guide 8 toward the first seat belt retractor 7. Accordingly, as shown in FIG. 5(b), the bag-like portion 2a of the webbing 2 inflates at the region between the tongue 9 and the belt guide 8. In addition, the initial, band-like shape of the bag-like portion 2a of the webbing 2 is maintained at the region between the belt guide 8 and the end of the bag-like portion 2a which is closer to the first seat belt retractor 7. Accordingly, a part of the bag-like portion 2a of the webbing 2 which is applied across the shoulder of the occupant inflates and receives the shoulder, chest, pelvis, etc., of the occupant who moves forward due to large inertia.

Accordingly, in addition to the effect of absorbing the kinetic energy obtained by the torsion bar, the load applied to the occupant by the webbing 2 is further reduced, so that the occupant is effectively restrained and protected. In such a case, since the length of the webbing 2 is reduced due to the inflation of the bag-like portion 2a, an initial restraining force as in conventional pretensioners can be obtained. Accordingly, the occupant is effectively restrained in the initial stage.

When the occupant moves further forward due to an increase in inertia, the webbing 2 is further extracted, so that the bag 3 further inflates in the longitudinal direction thereof. Accordingly, the volume of the bag 3 is increased and the internal pressure thereof is reduced, so that the kinetic energy is further absorbed. Thus, EA effect can also be obtained when the bag 3 inflates further. Also in this case, the bag 3 inflates to the belt guide 8 in accordance with the extraction of the webbing 2, but not beyond the belt guide 8.

Figure 5C:
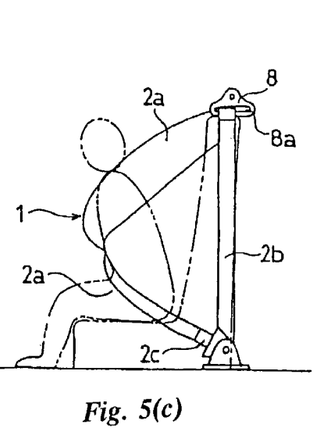
FIG. 5(c) is a diagram in which the inflation of the bag in the longitudinal direction thereof due to the gas is completed.
Figure 5D:
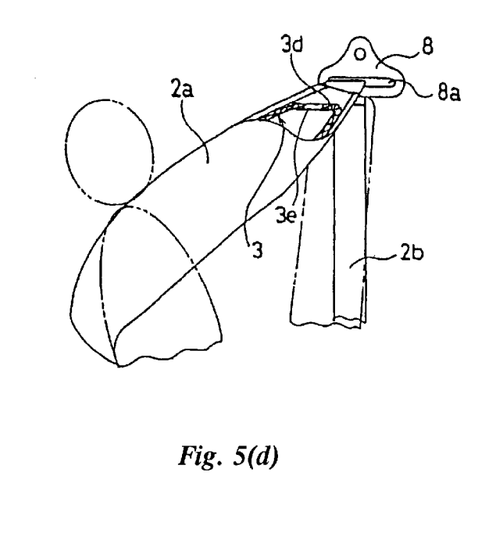
FIG. 5(d) is a diagram showing a vent hole which appears when the inflation of the air belt is completed.

As shown in FIG. 5(d), when the webbing 2 is still further extracted, the bag 3 completely inflates in the longitudinal direction thereof, so that the vent hole 3e appears. Thus, the gas inside the bag 3 is expelled through the vent hole 3e in the bag-like portion 2a of the webbing 2, and then expelled out through the bag-like portion 2a, which has air permeability. Accordingly, kinetic energy is still further absorbed, so that the load applied to the occupant is still further reduced. For convenience, in FIG. 5(d), the overlying positional relationship between the belt guide 8 and the webbing 2 is the reverse of the positional relationship thereof shown in FIGS. 5(a) to 5(c).

Accordingly, in the inflatable seat belt apparatus 6 of an embodiment of the present invention, when a large deceleration of the vehicle occurs, for example, when the vehicle collides, the occupant is prevented from moving forward due to the inertia, and the kinetic energy is absorbed so that the load on the occupant is reduced. Accordingly, the occupant is reliably restrained and protected.

In addition, in the inflatable seat belt apparatus 6 of an embodiment of the present invention, EA effect can be obtained by the first seat belt retractor 7, by the inflation of the bag 3 and the bag-like portion 2a of the webbing 2, and by the increase of the volume of the bag 3 according to the inflation thereof in the longitudinal direction. Accordingly, even in the case in which, for example, a roll-over of the vehicle occurs and the occupant must be restrained for a relatively long time although the deceleration of the vehicle is less than that generated in a vehicle collision, the occupant is prevented from moving and the kinetic energy is absorbed so that the load applied to the occupant is reduced. Accordingly, the occupant is reliably restrained and protected. In this case, since the deceleration of the vehicle is less than that generated in a vehicle collision, the webbing 2 is extracted by a relatively small amount, so that the vent hole 3e hidden inside the folded bag 3 does not appear (i.e., is not exposed). Accordingly, the gas inside the bag 3 is expelled through the vent hole 3e only by an extremely small amount, so that the occupant can be reliably restrained and protected by a predetermined restraining force for a sufficiently long time.

According to the inflatable seat belt apparatus 6 of the present embodiment, under normal conditions, the bag 3 is folded along the folding line 7 which is perpendicular to the longitudinal direction of the bag 3. Thus, even when the actual length of the bag 3 is set to a relatively long length, the length of the bag 3 in the state in which it is stored in the bag-like portion 2a of the webbing 2 can be reduced. Accordingly, under normal conditions, the bag 3 stored in the bag-like portion 2a of the webbing 2 does not move through the guide hole 8a of the belt guide 8, so that the belt can be smoothly and reliably extracted and retracted and the belt can be easily operated.

Since the length of the bag 3 in the stored state can be reduced, not only can the actual length of the bag be increased, but there is more freedom to set a length. Accordingly, the actual length of the bag 3 can be adequately determined in accordance with the type of the vehicle in which the inflatable seat belt apparatus 6 is mounted.

In addition, due to the extraction of the webbing 2, the length of the inflating portion of the bag-like portion 2a of the webbing 2 varies with the inertia of the occupant. Accordingly, the tension of the webbing 2 varies with the amount by which the length of the inflating portion of the webbing 2 is increased. More specifically, the tension of the webbing can be varied in accordance with the inertia of the occupant, that is, the physical size of the occupant. When the occupant is small, the amount by which the length of the inflating portion of the webbing 2 is increased is small, so that the tension of the webbing 2 is also small. When the occupant is large, the amount by which the length of the inflating portion of the webbing is increased is large, so that the tension of the webbing is also large. Accordingly, the occupant can be more effectively restrained and protected in accordance with the his or her physical size.

In addition, since the bag 3 inflates in the longitudinal direction thereof due to the extension of the webbing 2, the internal pressure of the bag 3 can be reduced as the volume of the bag 3 is increased, and EA effect can be obtained also by the bag 3. Especially when EA effect obtained by the bag 3 and EA effect obtained by the EA mechanism of the seat belt retractor 7 are combined, the total EA effect can be precisely adjusted.

In addition, irrespective of the physical size of the occupant, the bag-like portion 2a of the webbing 2 inflates to the belt guide 8. Thus, the inflating portion of the bag-like portion 2a can be disposed near the side of the head of the occupant. Accordingly, in the case in which there is a collision with the side portion of the vehicle, the head of the occupant can be more effectively protected.

Figure 4B:
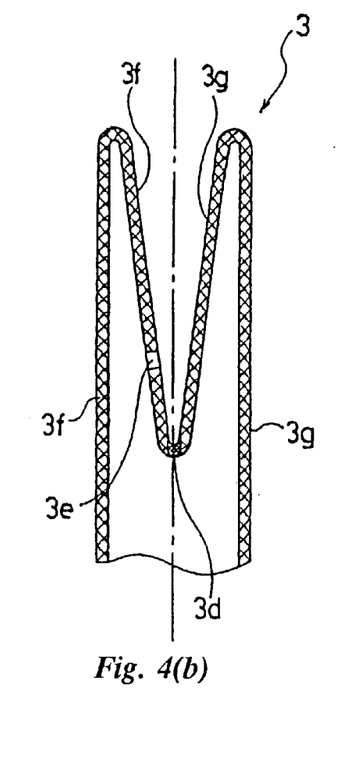

Although the vent hole 3e is formed at the upper end 3d of the bag 3 in the above-described embodiment, the vent hole 3e may also be formed in one or both of the fabrics 3f and 3g of the bag 3. In FIG. 4(b), for example, the vent hole 3e is formed in the fabric 3f. In such a case, the timing at which the vent hole 3e appears during the inflation of the bag 3 can be set merely by determining the position of the vent hole 3e in the longitudinal direction of the bag 3. Thus, the timing at which the gas is expelled from the bag 3 via the vent hole 3e and EA effect thereby occurs can be set in accordance with the type of the vehicle. Accordingly, in the inflatable seat belt apparatus 6, the vent hole 3e can be formed in at least one of the upper end 3d of the bag 3 and the fabrics 3f and 3g.

Figure 4C:
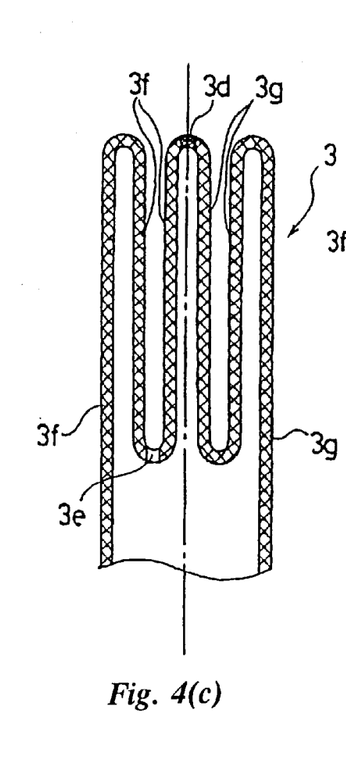

In addition, although the bag 3 is folded along a single line γ in the above-described embodiment, the bag 3 may also be folded along two folding lines γ' and γ" shown by the double-dotted chain lines, which are imaginary lines, in FIG. 3(a). In this case, as shown in FIG. 4(c), the bag 3 may be folded in such a manner that the folded portion of the bag 3 is disposed between the fabrics 3f and 3g in the unfolded portion of the bag 3. In this case, the vent hole 3e is formed in the folded portion of the fabric 3f, so that it is hidden under normal conditions in which the bag 3 is folded. Although the thickness of the bag 3 is increased relative to the above-described embodiment, the length of the bag 3 in the stored state can be reduced, so that the actual length of the bag 3 can be further increased.

Figure 4D:
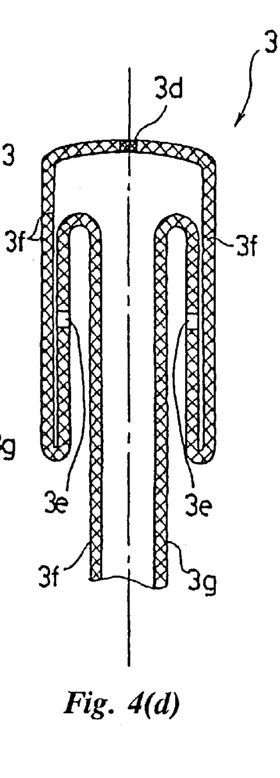

In addition, as shown in FIG. 4(d), the bag 3 may also be folded along the two folding lines γ' and γ" shown in FIG. 3(a) in such a manner that the folded portion of the bag 3 is disposed outside the fabrics 3f and 3g of the unfolded portion of the bag 3. In this case, two vent holes 3e are formed in the folded portions of the fabrics 3f and 3g so that they are hidden under normal conditions in which the bag 3 is folded. The advantage of this example is substantially the same as that of the example shown in FIG. 4(c).

In the above-described embodiment, the vent hole 3e is formed at a position such that it is exposed when the inflation of the bag 3 in the longitudinal direction of the bag 3 is almost completed. Thus, even when, for example, a roll-over of the vehicle occurs and the occupant is restrained and protected for a relatively long time, reduction of the restraining force can be prevented. In addition, in the case in which, for example, the vehicle collides the effect of absorbing the kinetic energy of the occupant due to the vent hole 3e can be reliably obtained.

Although only a part of the webbing 2 is constructed as the air belt 1 in the above-described embodiment, at least a part of the webbing 2' that comes into contact with the occupant can also be constructed as an air belt having the same construction. In addition, the method of injecting the gas is not limited to the above-described embodiment, and other adequate gas-injecting methods may of course be used.

Figure 6:
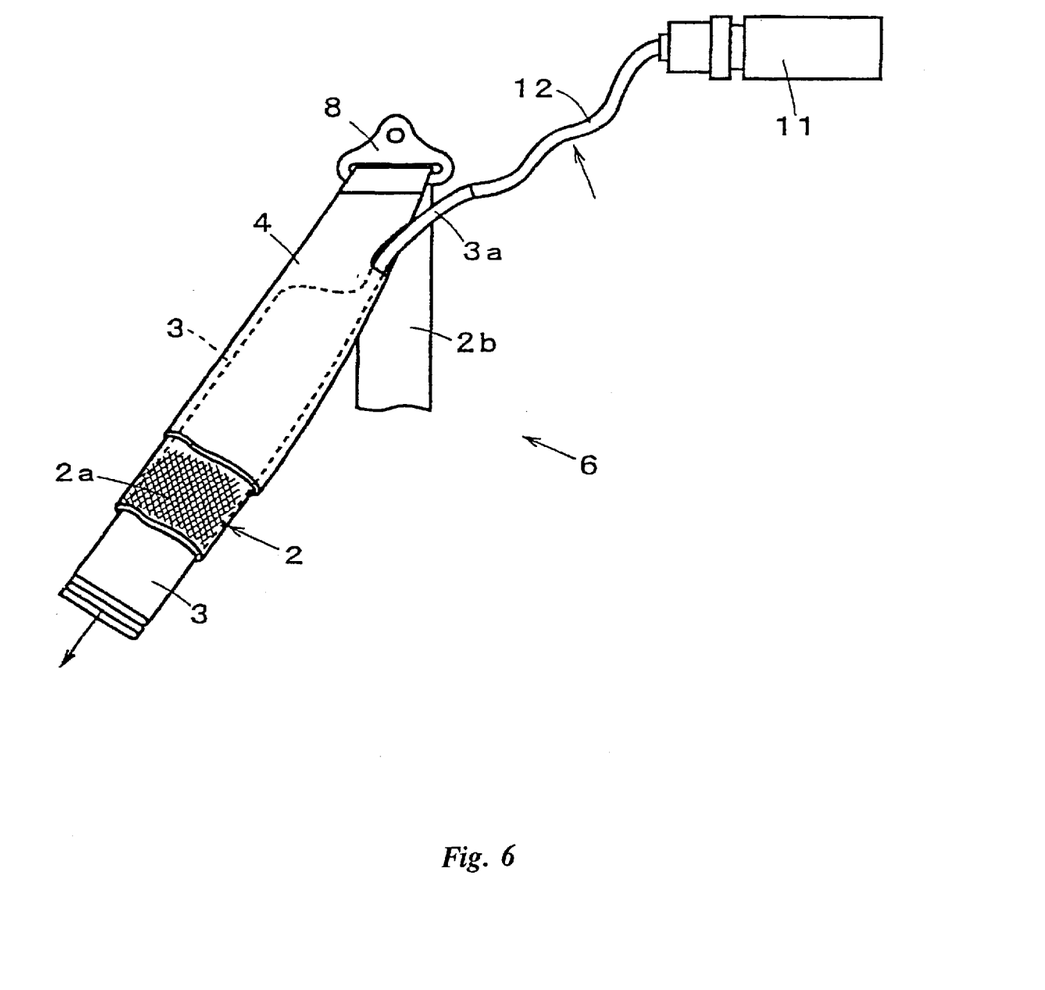
FIG. 6 is a perspective view of part of an inflatable seat belt apparatus which includes an air belt according to another embodiment of the present invention.

FIG. 6 is a perspective view showing a part of an inflatable seat belt apparatus which includes an air belt according to another embodiment of the present invention.

In the above-described embodiment, the gas supplied from the gas generator 11 is injected into the bag 3 at the end closer to the tongue 9 so that the bag 3 inflates toward the belt guide 8 along the longitudinal direction of the webbing 2. In contrast, as shown in FIG. 6, in the inflatable seat belt apparatus 6 of the present embodiment, the gas supplied from the gas generator 11 is injected into the bag 3 at the end closer to the belt guide 8, so that the bag 3 inflates toward the tongue 9 along the longitudinal direction of the webbing 2.

More specifically, the bag 3 is disposed such that the gas inlet 3a of the bag 3 is at the upper end thereof, so that the gas inlet 3a opposes the belt guide 8. The gas inlet 3a is inserted through the webbing 2 and the cover 4 and extends from inside the webbing 2 to outside the cover 4. The gas inlet 3a which extends outside is connected to the gas generator 11 via a gas injecting tube 12. The gas injecting tube 12 expands and shrinks or bends so as to absorb the displacement of the webbing 2 and the bag 3 in the longitudinal direction, which occurs due to the extraction and retraction of the webbing 2 under normal conditions. Accordingly, the webbing 2 can be smoothly extracted and retracted. In accordance with various embodiments of the present invention, the gas generator 11 may be installed in a roof, a center pillar, a rear pillar, etc., of the vehicle.

In the present embodiment, the bag 3 is folded in one of the above-described folding methods, and at least one vent hole 3e is hidden in the state in which the bag 3 is folded. In such a case, the lower portion of the bag 3 is of course folded along the folding line γ, or along the folding lines γ' and γ" which are perpendicular to the longitudinal direction of the webbing 2. Other constructions of the air belt 1 and the inflatable seat belt apparatus 6 of the embodiments of the present invention may be the same as in the above-described embodiment.

In addition, not only the gas injecting tube 12 but also the gas inlet 3a may have the function of absorbing the displacements of the webbing 2 and the bag 3. Alternatively, only the gas inlet 3a may have the function of absorbing the displacements of the webbing 2 and the bag 3. In addition, the gas inlet 3a may be extended and directly connected to the gas generator 11. In this case, it is necessary that the gas inlet 3a have the above-described function of absorbing the displacements.

In addition, the seat belt may also hang in such a manner that the bag is disposed at the a part of the webbing 2 that comes into contact with the occupant when the seat belt is fastened, and that the webbing 2 can be relatively moved. Also in this case, the gas injecting tube 12 may have the function of absorbing the displacements of the webbing 2 and the bag 3, although this is not necessary.

In the inflatable seat belt apparatus 6 of the present embodiment which is constructed as described above, the bag 3 inflates in the direction from the belt guide 8 toward the tongue 9 as shown by the arrow in FIG. 6.

In this case, the bag 3 can be disposed such that it does not extend to the tongue 9 under normal conditions.

Accordingly, in the case in which the tongue 9 is retained in a manner slidable relative to the webbing 2, the tongue 9 can be smoothly slid relative to the webbing 2, so that the tongue 9 can be operated easily.

In addition, since the gas generator 11 can be installed in the roof, the center pillar, the rear pillar, etc., of the vehicle, the excess space can be effectively utilized. Thus, there is more freedom to choose the position to install the gas generator 11 than in conventional systems.

FIG. 7 shows an air belt according to another embodiment of the present invention. In the above-described embodiment shown in FIG. 6, the bag 3 is constructed such that it inflates in the direction from the belt guide 8 toward the tongue 9 along the longitudinal direction of the webbing 2. In contrast, in the present embodiment, the bag 3 inflates in the direction from the tongue 9 toward the belt guide 8 along the longitudinal direction of the webbing 2.

Figure 7A:
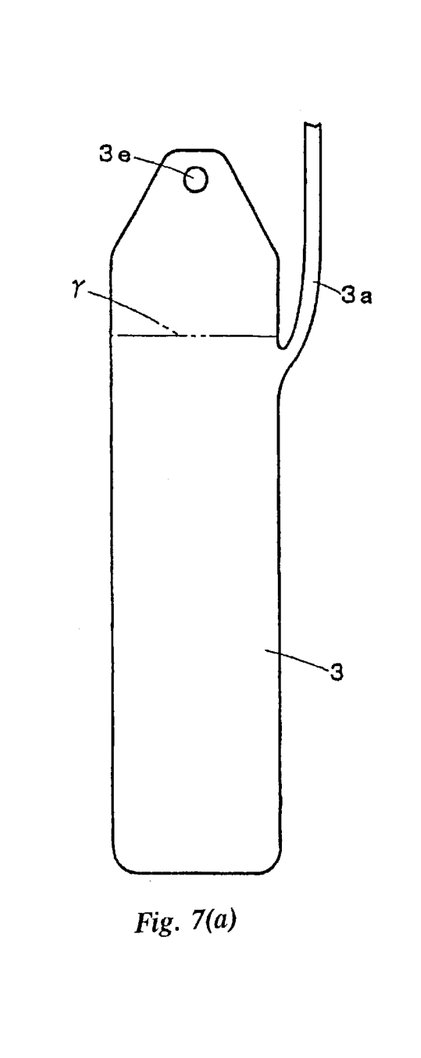
FIG. 7(a) is a diagram showing a bag of the air belt in an unfolded state.
Figure 7B:
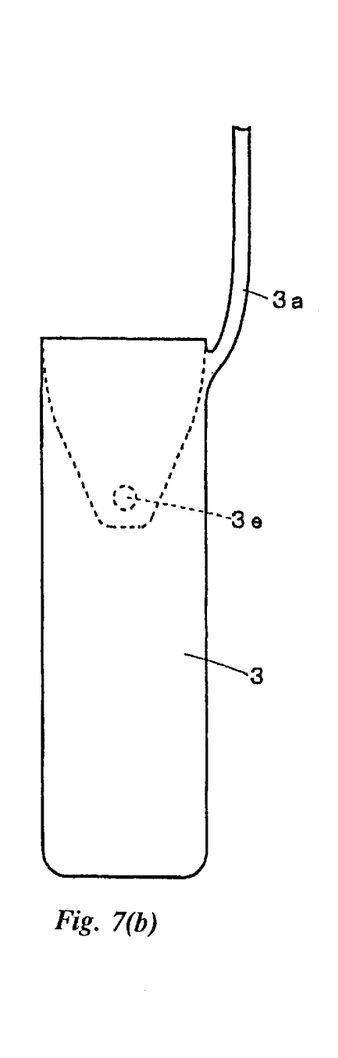
FIG. 7(b) is a diagram showing a state in which the bag is folded along a folding line y which extends in a direction perpendicular to the longitudinal direction of the bag.
Figure 7C:
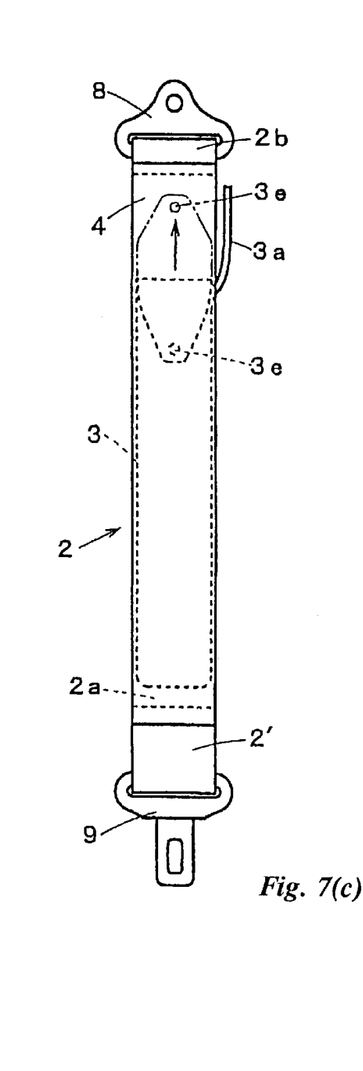
FIG. 7(c) is a diagram showing a part of an inflatable seat belt apparatus using the air belt.

More specifically, as shown in FIGS. 7(a) and 7(b), the upper portion of the bag 3 is folded along at least the folding line γ which is perpendicular to the longitudinal direction of the webbing 2, and the vent hole 3e is hidden inside. Of course, the bag 3 may also be folded by a different method; for example, the bag 3 can also be folded along the folding lines γ' and γ" as described above. As shown in FIG. 7(c), the folded bag 3 is stored in the bag-like portion 2a of the webbing 2.

Other constructions of the air belt 1 and the inflatable seat belt apparatus 6 of the present embodiment are the same as in the above-described embodiment shown in FIG. 6. In the inflatable seat belt apparatus 6 which is constructed as described above, the bag 3 inflates in the direction from the tongue 9 toward the belt guide 8 in the longitudinal direction of the webbing 2, that is, in the direction shown by the arrow in FIG. 7(c).

According to the inflatable seat belt apparatus 6 of the present embodiment, as in the embodiment shown in FIGS. 1 to 5, the bag 3 stored in the bag-like portion 2a of the webbing 2 does not move through the guide hole 8a of the belt guide 8 under normal conditions. Accordingly, under normal conditions, the belt can be smoothly and reliably extracted and retracted, so that the belt can be easily operated.

Other operations and effects of the air belt 1 and the inflatable seat belt apparatus 6 according to the embodiment shown in FIG. 7 may be the same as those in the above-described embodiment shown in FIG. 6.

Figure 8:
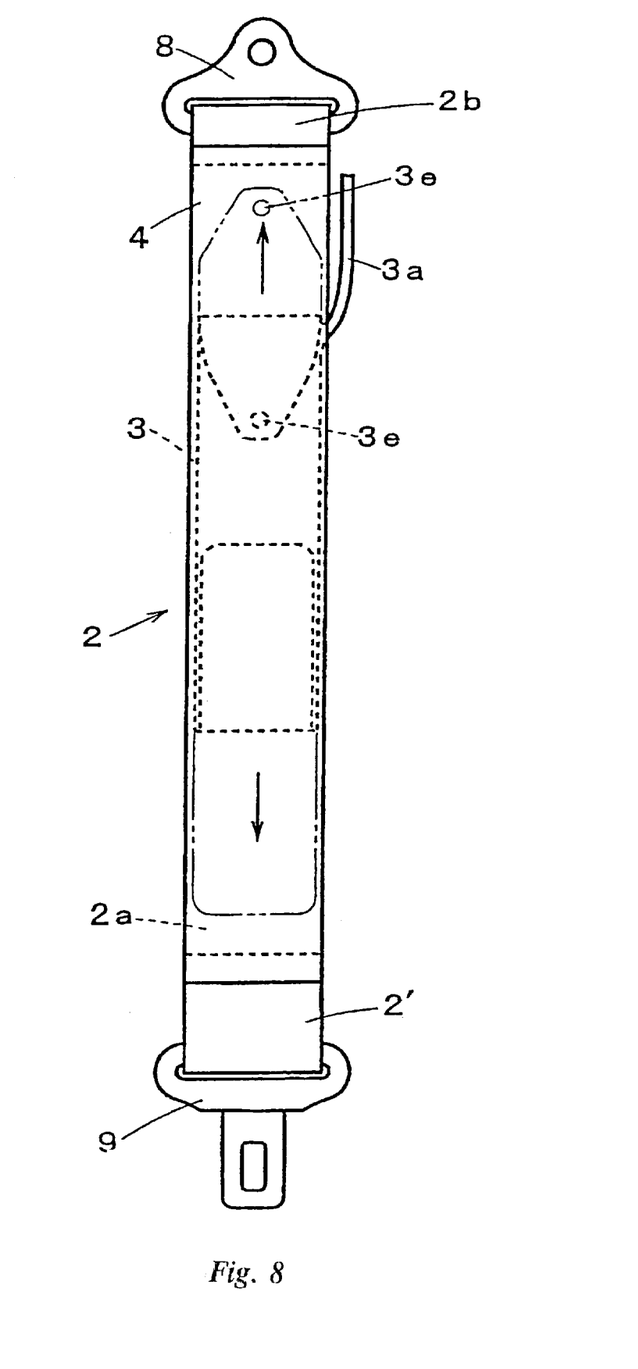
FIG. 8 is a showing a part of an inflatable seat belt apparatus which includes an air belt according to another embodiment of the present invention.

FIG. 8 is a diagram corresponding to FIG. 7(c) showing a part of an inflatable seat belt apparatus using an air belt according to another embodiment of the present invention.

In the above-described embodiment shown in FIG. 6, the bag 3 inflates only in the direction from the belt guide 8 toward the tongue 9 along the longitudinal direction of the webbing 2. In addition, in the above-described shown in FIG. 7, the bag 3 inflates only in the direction from the tongue 9 toward the belt guide 8 along the longitudinal direction of the webbing 2. In contrast, in the present embodiment shown in FIG. 8, the bag 3 inflates in both the direction from the belt guide 8 to the tongue 9 and the direction from the tongue 9 to the belt guide 8 along the longitudinal direction of the webbing 2.

More specifically, as shown in FIG. 8, both the upper portion and the lower portion of the bag 3 of the present embodiment are folded along folding lines corresponding to the above-described folding line γ, which is perpendicular to the longitudinal direction of the webbing, and the vent hole 3e is hidden inside. Although the vent hole 3e is formed in only the upper portion of the bag in the figure, the vent hole 3e may also be formed in only the lower region of the bag 3, or in both the upper and lower portions of the bag 3. Of course, the upper and the lower portions of the bag 3 may also be folded by a different method; for example, they can also be folded along the folding lines corresponding to the above-described folding lines γand γ".

As shown in FIG. 8, the bag 3 which is folded as described above is stored in the bag-like portion 2a of the webbing 2. Other constructions of the air belt 1 and the inflatable seat belt apparatus 6 of the embodiment shown in FIG. 8 may be the same as in the above-described embodiment shown in FIG. 7.

In the inflatable seat belt apparatus 6 which is constructed as described above, the bag 3 inflates in both the direction from the belt guide 8 to the tongue 9 and the direction from the tongue 9 toward the belt guide 8 along the longitudinal direction of the webbing 2 as shown by the arrows in FIG. 8. Other operations and effects of the air belt 1 and the inflatable seat belt apparatus 6 according to the embodiment shown in FIG. 8 my be the same as those in the above-described embodiment shown in FIG. 7.

As is apparent from the foregoing descriptions, according to an embodiment of the air belt of the present invention, under normal conditions, the bag is folded along the folding line which is perpendicular to the longitudinal direction thereof. Thus, even when the actual length of the bag is set to a relatively long length, the length of the bag in the state in which it is stored in the bag-like portion of the webbing can be reduced. In addition, since the length of the bag in the stored state can be reduced, not only can the actual length of the bag be increased, but there is more freedom to set a length.

In addition, according to the inflatable seat belt apparatus of an embodiment of the present invention, the bag stored in the inflatable portion of the webbing does not move through the guide hole of the belt guide under normal conditions. Accordingly, under normal conditions, the belt can be smoothly and reliably extracted and retracted, so that the belt can be easily operated.

In addition, since the freedom to set the actual length of the bag is higher, the actual length of the bag can be adequately determined in accordance with the type of the vehicle in which the inflatable seat belt apparatus is mounted.

Furthermore, in an emergency, the bag and the bag-like portion of the webbing quickly inflate toward the belt guide along the longitudinal direction of the air belt due to the gas supplied from the gas generating means. Thus, similarly to the conventional air belt, the area of the bag-like portion of the webbing which receives the kinetic energy of the occupant is increased, so that the load can be dispersed. Accordingly, the load applied to the occupant can be reduced, and the occupant can be more effectively protected.

Furthermore, in an emergency, the length by which the webbing is extracted due to the EA mechanism of the seat belt retractor varies with the inertia of the occupant. Thus, the length of the inflating portion of the bag-like portion of the webbing can be varied in accordance with the inertia of the occupant. Accordingly, the tension of the webbing can be varied along with the amount by which the length of the inflating portion of the webbing is increased. More specifically, the tension of the webbing can be varied in accordance with the inertia of the occupant, that is, the physical size of the occupant. Since the tension of the webbing can be made small for a small occupant and large for a large occupant, the occupant can be more effectively restrained and protected in accordance with his or her physical size.

Furthermore, since the bag inflates in the longitudinal direction thereof due to the extraction of the webbing, the internal pressure of the bag is reduced as the volume of the bag is increased. Accordingly, the kinetic energy of the occupant can be effectively absorbed, and the EA effect can be obtained also by the bag. Especially when the EA effect obtained by the bag and the EA effect obtained by the EA mechanism of the seat belt retractor are combined, the total EA effect can be precisely adjusted.

In addition, irrespective of the physical size of the occupant, the bag-like portion of the webbing inflates to the belt guide and the inflating portion of the bag-like portion is disposed near the side of the head of the occupant. Thus, in the case in which there is a collision with the side portion of the vehicle, the head of the occupant can be more effectively protected.

In addition, according to an embodiment of the present invention, the bag is provided with the vent hole, which is formed at a position such that it appears when the inflation of the bag in the longitudinal direction thereof is almost completed. Thus, even when, for example, a roll-over of the vehicle occurs and the occupant is restrained and protected for a relatively long time, reduction of the restraining force can be prevented. In addition, in the case in which, for example, the vehicle collides, the effect of absorbing the kinetic energy of the occupant due to the vent hole can be reliably obtained.

Furthermore, according to an embodiment of the present invention, the bag is provided with the gas inlet at a position close to the tongue or at a position close to the belt guide. Thus, the gas generating means can be disposed either in a floor portion of the vehicle or in the upper portion of the vehicle. Especially when the gas inlet is disposed at a position close to the belt guide, the gas generating means can be disposed in a roof, a center pillar, a rear pillar, etc., of the vehicle. Thus, the excess space in the vehicle can be effectively utilized, and there is more freedom to choose the position to install the gas generating means.

In addition, since the bag can be disposed such that it does not extend to the tongue under normal conditions, in the case in which the tongue is retained in a manner slidable relative to the webbing, the tongue can be smoothly slide relative to the webbing 2, so that the tongue can be operated easily.

The priority application, Japanese Patent Application No. 2000-384034 filed on Dec. 18, 2000, is hereby incorporated by reference herein in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An inflatable seat belt apparatus comprising:
 a band shaped webbing;
 an inflatable bag stored in a portion of the webbing that comes into contact with an occupant, wherein the bag is positioned so that the longitudinal directions of the bag and the webbing are the same and is folded along a line which is substantially perpendicular to the longitudinal direction of the bag,
 wherein the bag is configured to be inflated by a gas supplied from a gas generator thereby expanding the portion of the webbing; and
 a cover that covers the portion of the webbing in which the bag is stored, wherein the cover is configured to open in an emergency due to an inflation force of the gas.

2. The apparatus of claim 1, further comprising:
 a seat belt retractor that operates to allow extraction and retraction of the webbing during non-emergency conditions and to prevent the extraction of the webbing in an emergency;
 a belt guide having a hole through which the webbing passes in a slidable manner so that the webbing is guided toward the occupant under normal conditions; and
 a tongue connected to the webbing and configured to engage a buckle, wherein the bag is disposed in a region of the webbing closer to the occupant than the belt guide, and
 wherein the bag initially inflates in at least one of a direction toward the belt guide and a direction toward the tongue.

3. The inflatable seat belt apparatus of claim 2, wherein the bag includes a vent hole positioned between folded sections of the bag when the bag is not inflated and which becomes exposed when the bag inflates in the direction toward the belt guide so that the gas inside the bag is expelled therethrough.

4. The inflatable seat belt apparatus of claim 2, wherein the bag includes a gas inlet, through which the gas supplied from the gas generator is injected into the bag at a position close to the tongue.

5. The inflatable seat belt apparatus of claim 2, wherein the bag includes a gas inlet positioned adjacent the belt guide, for receiving gas from the gas generator.

6. An inflatable air belt comprising:
 a webbing having an inflatable portion and a non-inflatable portion;
 an inflatable bag positioned in the inflatable portion of the webbing;
 wherein the bag is folded in a direction perpendicular to a longitudinal direction of the webbing and includes a vent hole positioned to be blocked when the bag is folded, and to be exposed when the bag is unfolded.

7. A seat belt apparatus comprising:
 a belt guide having an opening through which an inflatable seat belt passes;
 wherein the inflatable seat belt includes a webbing having an inflatable portion and a non-inflatable portion;
 an inflatable bag positioned in the inflatable portion of the webbing;
 wherein the bag is folded in a direction perpendicular to a longitudinal direction of the webbing and is positioned so that the bag does not pass through the opening;
 wherein the webbing is positioned so that the inflatable portion of the webbing passes through the opening.

8. A seat belt apparatus having an energy absorbing effect for protecting an occupant of a vehicle in an emergency comprising:
 a webbing having an inflatable portion enclosing an inflatable bag;
 wherein a length of the inflatable portion of the webbing that inflates in the emergency varies with an inertial force of the occupant created by the occupant's motion toward the webbing.

9. The apparatus of claim 8, further comprising a seat belt guide having an opening; wherein the inflatable portion passes through the opening, and wherein the part of the inflatable portion located on the opposite side of the opening from the occupant does not inflate.

10. The seat belt apparatus of claim 9, wherein the length of the inflatable portion of the webbing is adjusted by changing the position of the webbing relative to the seat belt guide.

11. The seat belt apparatus of claim 9, wherein the webbing and the guide are arranged so that the position of the webbing relative to the seat belt guide may be adjusted by the inertial force of the occupant against the webbing.

* * * * *